Feb. 28, 1967         K. SCHMIDT ETAL         3,306,771
PLURAL ESTER-IMIDE RESINS ON AN ELECTRICAL CONDUCTOR
Filed Nov. 13, 1964
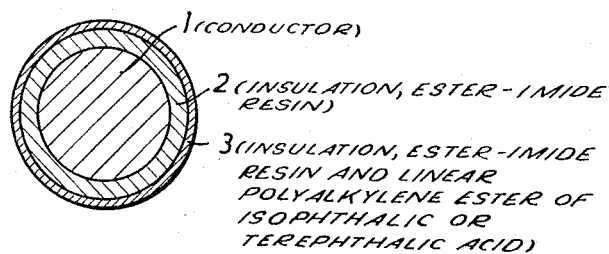
INVENTORS
Karl Schmidt
Ferdinand Hansch
Hans-Malte Rombrecht
BY
Michael J. Striker United States Patent Office 3,306,771
Patented Feb. 28, 1967

3,306,771
PLURAL ESTER-IMIDE RESINS ON AN
ELECTRICAL CONDUCTOR
Karl Schmidt, Hamburg, Ferdinand Hansch, Hamburg-Osdorf, and Hans-Malte Rombrecht, Hamburg-Altona, Germany, assignors to Dr. Beck & Co., G.m.b.H., Hamburg, Germany
Filed Nov. 13, 1964, Ser. No. 410,900
Claims priority, application Germany, Nov. 18, 1963, B 74,306
5 Claims. (Cl. 117—218)

The present invention relates to insulated electrical conductors provided with a novel type of resin insulation having an excellent thermal stability and a high abrasion resistance.

Electrical conductors insulated with varnish films are usually prepared by drawing the metallic conductor through a bath made of a resin solution, if required repeatedly, evaporating the solvent after each passage by the application of heat, and subsequently stoving and curing the varnish on the conductor. Cross-linked terephthalic acid polyesters have for some time been used for the purpose of obtaining coated wires having a high thermal resistance. One drawback of this insulation is its unsatisfactory resistance to thermal shock. The latter can be increased, for example, according to the proposals of U.S. specification 3,022,200, by coating the wires provided with a basic insulating layer with an additional outer layer consisting of a high-molecular linear glycol-polyester of terephthalic acid. However, these linear polyesters adversely affect the dielectric properties, particularly at elevated temperatures.

On the other hand, an entirely new class of materials has been recently proposed for use in the electrical insulation of conductors. These are the so-called ester-imide resins, i.e. polyester resins which contain cyclic imide groups in the polyester chains. Here, the imide groups are built into the polyester chains in such a manner that the functional groups of the polyester component are connected to each other through different members of the cyclic imide ring. The production of such ester-imide resins and of electrical conductors, e.g. wires, coated with these resins have been described in our co-pending United States applications, Serial No. 238,315, filed November 2, 1962, Serial No. 371,093, filed May 28, 1964, and Serial No. 384,262, filed July 21, 1964.

These insulating varnish films show not only an excellent thermal stability and very good dielectric properties; they are also distinguished in particular by a very good resistance to thermal shock. However, the abrasion resistance of such wire varnish insulators is sometimes not sufficiently high to process the wire on modern, fully automatic winding machines.

It has now been found, that the elasticity and in particular the abrasive strength of such varnish-insulated electrical conductors can be greatly improved by depositing in known manner an additional insulating layer of a particular composition on to the ester-imide insulating layer.

According to the invention, therefore, there is provided an electrical conductor provided with an electrically insulating coating consisting of an inner insulating layer constituted by an ester-imide resin and superimposed thereon an outer insulating layer constituted by a combination of a cross-linked ester-imide resin with a linear polyalkylene ester of isophthalic acid and/or terephthalic acid.

It is noteworthy that the desired effects can be obtained only by this combination of the cross-linkable ester-imide resin with the purely linear polyalkylene ester, whereas an additional coat composed of a purely linear polyalkylene ester alone does not yield equally satisfactory results. By the inclusion of the imide-group containing polyesters in the second coating, a better abrasion-resistance is obtained than when linear terephthalic acid polyesters alone are used. The dielectric data are also improved in comparison with a covering layer composed of purely linear polyalkylene esters alone.

The polyalkylene ester resin of the covering layer is preferably a high-molecular weight glycol terephthalate. Preferably, the outer insulating layer is of a smaller thickness than the inner insulating layer. Conveniently, the same ester-imide resin is employed in both the covering layer and in the base layer.

The structure of the insulated electrical conductors of the present invention is shown in the accompanying drawing, which shows a cross-section through an insulated wire according to the invention.

Referring to the drawing, on an electrical conductor 1, in this case a wire, there is deposited first of all an inner insulating layer 2 consisting of an ester-imide resin, i.e. an imide-group-containing polyester resin which is hardened thereon, as described, for example, in our previously mentioned co-pending pataent applications. This first insulating layer is then covered by a second, preferably thinner, coating 3, constituted by a combination of a cross-linked ester-imide resin with a linear polyalkylene ester of isophthalic or terephthalic acid.

The preparation of insulated electrical conductors according to the invention may be carried out by first depositing in known manner the inner layer 2, if necessary in several steps, and hardening it. This is followed by the deposition, again in a manner known per se, of the second, thinner outer layer 3 by drawing the conductor provided with the inner layer 2 once or several times through a solution of the heated resins composing the desired combination, the resins thereafter being stored thereon by the action of heat.

The process conditions, in particular the stoving temperature and the take-off speed, may be so chosen as to be identical for the preparation of both layers, so that the process can be carried out, advantageously, in a single operation. Provision must in this case be made for the wire to traverse the two baths in succession and separately. The wire may of course pass several times through a given bath.

As already indicated, the outer coat may include as the ester-imide component the same resin which is used for the inner layer. As the second component of the outer insulating layer according to the invention, i.e. as the linear polyalkylene resin, there is advantageously employed a high-molecular weight glycol terephthalate, which is also suitable for the production of fibres.

The two components, i.e. the ester-imide resin and the glycol terephthalate resin, are preferably employed in the outer insulating layer in proportions of 20:80 to 60:40 by weight. The preferred proportions are from 40:60 to 50:50 by weight.

The preparation of a coating varnish for the outer layer can be advantageously carried out in the following manner: to a 3 to 8%, preferably 5 to 6%, solution of the ester-imide in a solvent, for example, in a mixture of phenol and cresols, there are added 5 to 10%, preferably 7 to 8%, of the linear alkylene-polyester at an elevated temperature, for example, a temperature in the region of 90° C., while stirring, the linear polyester being added in small portions, which are dissolved completely. Water, which may be present in the solvent, or water adhering to the resin is eliminated with the aid of a small amount of xylene under vacuum. Once the xylene has been completely distilled off, the heating is continued for a short while without vacuum, for example, to about 120° C. for 30 minutes. There is obtained a solution of the resin mixture, which can be easily processed into a wire-coating composition by the usual methods. The varnish remains clear and can be stored for several months. A 13–14% solution of the resin mixture in phenol/cresol with a viscosity of 80–100 sec., measured at 20° C. in a 4 mm. cup in accordance with the German Industrial Standard, is, for example, suitable.

It may be mentioned here briefly, for the sake of completeness only, that the known ester-imide resins which are employed according to the invention, are prepared according to the instructions given in the aforementioned co-pending patent application, by reacting polyvalent carboxylic acids, polyhydric alcohols and compounds having primary amino groups, optionally, together with hydroxycarboxylic acids or their derivatives, aminocarboxylic acids and/or aminoalcohols, being used in the preparation of the polyester in which the functional groups of the molecule are interconnected through an imide ring, or, alternatively, such components being used in the resin condensation that the desired imide rings form within the polyester chains during the condensation reaction.

In the following examples, Example 1 describes the preparation of an ester-imide resin for use in forming the base insulating layer of the metallic conductor, and Example 2 describes the preparation of a resin solution based on a linear polyalkylene ester. In this example, a high-molecular glycol terephthalate manufactured by Farbwerke Hoechst was employed, which is supplied in granular form, as polyester chips. Example 3 describes the preparation of a varnish for use for the outer coating of an electrical conductor insulated according to the invention, the resin combination used in this varnish being composed of the ester-imide resin of Example 1 and the linear polyester of Example 2.

*Example 1*

98.4 g. of dimethyl terephthalate, 29.0 g. of glycerine and 43.5 g. of ethylene glycol were slowly heated with 20.0 g. of cresol, 1.0 g. of cerium naphthenate, and 0.3 g. of calcium naphthenate in a three-necked flask of 2 litres capacity, equipped with a stirrer, thermometer and distillation column. From 140° C. onwards, the temperature was increased by about 5° C. every hour, until the theoretical amount of methanol was distilled off at about 200° C. The terephthalic ester formed was diluted with 170 g. of cresol and cooled to 80° C. Following this, 149.7 g. of trimellitic anhydride and 76.3 g. of 4,4'-diaminodiphenylmethane were added thereto and the temperature was again increased. At about 140° C., there precipitated the dicarboxylic acid, namely the bis-4,4'-(trimellitimido)-diphenylmethane as a thick, yellow precipitate and water distilled off. The temperature was further increased in such a manner, that the head temperature always remained at 100° C. The distillate consisted mostly of water. After the charge became clear, the temperature was maintained at 205–215° C. for a further 2 hours, whereafter the charge was diluted with cresol to a solids content of 58–60%. This resin solution was also employed for producing the coating varnish of Example 3. For preparing the varnish for preparing the base insulating layer, the cresol solution of the above resin was further mixed with 1.7% of butyl titanate and 0.28% of p-toluenesulphonic acid, calculated on the solid resin content and was diluted with cresol, solvent-naphtha and xylene to a solids content of 28% and a viscosity of 110 sec. measured at 20° C. in a 4 mm. cup according to the German Industrial Standard.

*Example 2*

394 g. of phenol, 219 g. of o-cresol and 262 g. of cresol DAB IV (a commercial quality cresol common in Germany; clear, yellowish to light-brown liquid; the solution in 15% soda lye precipitates only a few flakes; density at 20° C., about 1,034; boiling limits 192–205° C. or 196–209° C.; m-cresol content: 25–30%; sulfur: at most 0.015%; water: at most 0.2%) were heated to 80–90° C. and 125 g. of glycol terephthalate were added thereto in small portions while stirring. The mixture was stirred for about 3 hours at this temperature, until complete dissolution of the polyester had taken place. Following this, 10 cc. of xylene were added to the mixture, and traces of water were distilled off with the xylene in vacuo. After complete elimination of the xylene, the vacuum was released and heating was continued for one hour at 110° C. The solution was then cooled to 60° and filtered. It had a solids content of 13%.

*Example 3*

159 g. of the 58% resin solution prepared according to Example 1 were diluted with 755 g. of phenol, 421 g. of o-cresol and 505 g. of cresol DAB IV and were then heated to 90° C. 160 g. of the aforementioned polyester chips were added to this solution while stirring, in small portions. The solution was stirred for a further 3 hours at 90° C., until complete dissolution was achieved. Following this, 80 g. of xylene were added thereto, to be distilled off again completely together with the small amount of water present, in vacuo. The heating was then continued without vacuum at 110° C. for 30 minutes. The solution was filtered after cooling to 60° C. The varnish had a solids content of 13.6% and a viscosity of 85 sec. measured at 20° C. in a 4 mm. cup.

The varnishes described in the examples were deposited by a conventional process on a copper wire of 1 mm. diameter and were stoved thereon with the aid of a wire-enamelling furnace of 3.50 metres length, at a temperature of 480° C. The insulation of the samples hereinafter mentioned was carried out in the following manner:

*Sample A.*—Insulation composed entirely of ester-imide resin of Example 1. Two samples having insulating layers of different thickness were tested (A1 and A2) in order to demonstrate that the abrasion values remain the same on increasing the thickness of the layer, since the load acting on the insulator is chosen as a function of the layer thickness.

*Sample B.*—Base layer formed on the ester-imide resin of Example 1, outer layer made of the glycol terephthalate resin of Example 2.

*Sample C.*—Insulation according to the invention with a base layer formed of the ester-imide resin of Example 1, outer layer made of the combination of Example 3.

The test results obtained with the electrical conductors insulated in the aforedescribed manner are given in the following table:

| Sample | Thickness of insulating layer | Abrasion | Dielectric loss angle (800 cycles) tg δ.10⁴ | |
|---|---|---|---|---|
| A1 | 71μ | Load 675 g., 75 double strokes. | | |
| A2 | 54μ | Load 580 g., 72 double strokes. | 20° C | 68 |
| | | | 100° C | 53 |
| | | | 150° C | 49 |
| | | | 180° C | 54 |
| | | | 200° C | 151 |
| | | | 220° C | 456 |
| B | Base layer 56μ, Covering layer 17μ, Total: 73. | Load 680 g., 85 double strokes. | 20° C | 72 |
| | | | 100° C | 111 |
| | | | 150° C | 65 |
| | | | 180° C | 68 |
| | | | 200° C | 211 |
| | | | 220° C | 547 |
| C | Base layer 54μ, Covering layer 18μ, Total: 72. | Load 680 g., 122 double strokes. | 20° C | 78 |
| | | | 100° C | 52 |
| | | | 150° C | 87 |
| | | | 180° C | 55 |
| | | | 200° C | 138 |
| | | | 220° C | 442 |

The table clearly shows that the electrical conductor insulated according to the invention (Sample C) displays a greatly improved abrasion resistance. The tg δ curve of Sample B shows a maximum at 100° C., caused by the linear polyester. With the Sample C, i.e. with the conductor insulated according to the invention an additional maximum occurs only at 150° C.

What we claim as our invention and desire to secure by Letters Patent of the United States is:

1. An electrical conductor provided with an electrically insulating coating comprising an inner insulating layer consisting essentially of an ester-imide resin and superimposed thereon an outer insulating layer imparting increased abrasion resistance to the conductor insulation and consisting essentially of a combination of a cross-linked ester-imide resin with a linear polyalkylene ester of at least one dibasic acid selected from the group consisting of isophthalic acid and terephthalic acid, the proportion in said combination of ester-imide resin to linear polyalkylene being about 20:80 to 60:40 by weight.

2. An electrical conductor according to claim 1, wherein said linear polyalkylene ester is a high-molecular weight glycol terephthalate.

3. An electrical conductor according to claim 1, wherein the same ester-imide resin is used in both the inner insulating layer and the outer insulating layer.

4. An electrical conductor according to claim 1, wherein the outer insulating layer is thinner than the inner insulating layer.

5. An electrical conductor according to claim 1, the ester-imide resin of said inner and said outer insulating layer being a condensation product of an ester of terephthalic acid, glycerine and ethylene glycol, and bis-4,4'-(trimellitimido)-diphenylmethane.

References Cited by the Examiner

UNITED STATES PATENTS

| 2,523,999 | 9/1950 | Sattler et al. | 260—16 |
| 3,058,948 | 10/1962 | Mosiimann et al. | 117—232 |
| 3,105,775 | 10/1963 | Lavin et al. | 117—218 X |
| 3,190,770 | 6/1965 | Lavin et al. | 117—218 |
| 3,201,276 | 8/1965 | Meyer et al. | 117—218 |

ALFRED L. LEAVITT, *Primary Examiner.*

WILLIAM L. JARVIS, *Examiner.*